United States Patent
Lee et al.

(10) Patent No.: US 12,416,847 B2
(45) Date of Patent: Sep. 16, 2025

(54) REFLECTION MODULE AND CAMERA MODULE COMPRISING SAME

(71) Applicant: LG INNOTEK CO., LTD., Seoul (KR)

(72) Inventors: Seung Hak Lee, Seoul (KR); Ji Wook Moon, Seoul (KR); Yu Jeong Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 396 days.

(21) Appl. No.: 18/020,723

(22) PCT Filed: Aug. 11, 2021

(86) PCT No.: PCT/KR2021/010649
§ 371 (c)(1),
(2) Date: Feb. 10, 2023

(87) PCT Pub. No.: WO2022/035218
PCT Pub. Date: Feb. 17, 2022

(65) Prior Publication Data
US 2023/0350276 A1    Nov. 2, 2023

(30) Foreign Application Priority Data
Aug. 11, 2020  (KR) .................. 10-2020-0100476

(51) Int. Cl.
*G03B 17/17*   (2021.01)
(52) U.S. Cl.
CPC ..................... *G03B 17/17* (2013.01)
(58) Field of Classification Search
CPC .. G03B 17/17; G02B 13/0065; G02B 7/1805; G02B 5/04
See application file for complete search history.

(56) References Cited

U.S. PATENT DOCUMENTS

| | | | |
|---|---|---|---|
| 10,302,863 B2* | 5/2019 | Wu | G02B 3/0068 |
| 10,437,008 B2* | 10/2019 | Saita | G03B 17/17 |
| 10,816,756 B2 | 10/2020 | Lee et al. | |
| 11,102,387 B2 | 8/2021 | Lee et al. | |
| 11,409,073 B2 | 8/2022 | Lee et al. | |
| 12,164,215 B2* | 12/2024 | Lee | G02B 27/646 |

(Continued)

FOREIGN PATENT DOCUMENTS

| | | |
|---|---|---|
| JP | 2008-034063 | 2/2008 |
| JP | 2012-215656 | 11/2012 |

(Continued)

OTHER PUBLICATIONS

International Search Report dated Nov. 10, 2021 issued in Application No. PCT/KR2021/010649.

(Continued)

*Primary Examiner* — Rhonda S Peace
(74) *Attorney, Agent, or Firm* — KED & ASSOCIATES, LLP

(57) ABSTRACT

A reflective module disclosed in an embodiment of the invention includes a holder having an inclined bottom surface and both side walls of the inclined bottom surface; a reflective member disposed on the holder; and an adhesive bonding the reflective member to the holder, wherein the reflective member includes an incident surface, an exit surface, and a reflective surface opposite to the bottom surface, and the holder has a first surface facing both side surfaces of the reflective member, and a second recess portion, wherein the adhesive includes: a first adhesive adhered to lower portions of each side of the reflective member within the first and second recess portions; and a second adhesive adhered to an upper portion of each side surface of the reflective member, and the first and second adhesives may be of different types.

20 Claims, 11 Drawing Sheets

(56) References Cited

U.S. PATENT DOCUMENTS

| | | |
|---|---|---|
| 2005/0190683 A1 | 9/2005 | Ando |
| 2012/0033303 A1* | 2/2012 | Nagaoka ............... H04N 23/55 |
| | | 356/615 |
| 2018/0364450 A1 | 12/2018 | Lee et al. |
| 2019/0227200 A1 | 7/2019 | Kao et al. |
| 2020/0057313 A1 | 2/2020 | Lee et al. |
| 2020/0409033 A1 | 12/2020 | Lee et al. |
| 2021/0397017 A1 | 12/2021 | Jeong |
| 2022/0099919 A1 | 3/2022 | Lee et al. |
| 2022/0317253 A1* | 10/2022 | Pan ...................... G01S 7/4811 |
| 2023/0350276 A1* | 11/2023 | Lee ..................... G02B 7/1828 |

FOREIGN PATENT DOCUMENTS

| | | |
|---|---|---|
| JP | 2017-032871 | 2/2017 |
| KR | 10-2010-0091435 | 8/2010 |
| KR | 10-2017-0006731 | 1/2017 |
| KR | 10-2018-0137278 | 12/2018 |
| KR | 10-2019-0129798 | 11/2019 |
| KR | 10-2020-0039378 | 4/2020 |
| KR | 10-2020-0041067 | 4/2020 |
| KR | 10-2020-0047275 | 5/2020 |
| KR | 10-2020-0058365 | 5/2020 |
| KR | 10-2020-0062857 | 6/2020 |

OTHER PUBLICATIONS

European Search Report dated Sep. 11, 2024 issued in Application No. 21856224.7.

Korean Office Action dated Mar. 6, 2025 issued in Application No. 10-2020-0100476.

* cited by examiner

REFLECTION MODULE AND CAMERA MODULE COMPRISING SAME

CROSS-REFERENCE TO RELATED PATENT APPLICATIONS

This application is a U.S. National Stage Application under 35 U.S.C. § 371 of PCT Application No. PCT/KR2021/010649, filed Aug. 11, 2021, which claims priority to Korean Patent Application No. 10-2020-0100476, filed Aug. 11, 2020, whose entire disclosures are hereby incorporated by reference.

TECHNICAL FIELD

An embodiment of the invention relates to a reflective module and a camera module.

BACKGROUND ART

Users of portable devices require optical devices that have high resolution, are small in size, and have various photographing functions. For example, the various imaging functions may mean at least one of an optical zoom function (zoom-in/zoom-out), an auto-focusing (AF) function, or an image stabilization function or an optical image stabilization (OIS) function. In the conventional case, in order to implement the aforementioned various photographing functions, a method of combining several lenses and directly moving the combined lenses has been used. However, when the number of lenses is increased in this way, the size of the optical device may increase.

In the lens module, the lenses are sequentially fixed in the lens holder, that is, when the lenses are mounted in the lens holder, it is almost impossible to adjust the position, so that the precision of the mounting process is very high, but the yield of the product is relatively low. As such, the lens module cannot satisfy the needs of multiple lenses, and the development of lenses must overcome these structural limitations. In addition, in the design and production process, not only theoretical optical design may be put into actual mass production, but also modules for providing good product yield are being studied.

In general, a camera module may be manufactured by including a plurality of lenses, a lens barrel accommodating the plurality of lenses, an image sensor that converts light signals passing through the plurality of lenses into electrical signals, a circuit board on which the image sensor is mounted, and a housing for fixing the lens barrel to the circuit board. Optical axis alignment between the plurality of lenses may be achieved by fitting or adhering the lenses to the lens barrel. In addition, in case of directly moving a barrel or a holder including a lens for image stabilization, both the weight of the lens itself and the weight of other members to which the lens is attached must be considered, so the movement requires a certain level of driving force, which increases power consumption.

DISCLOSURE

Technical Problem

An embodiment of the invention may provide a reflective module and a camera module in which the assembly of a reflective member and the holder is improved.

An embodiment of the invention may provide a reflective module and a camera module with improved adhesion between the reflective member and the holder.

An embodiment of the invention may provide a reflective module in which a reflective member is adhered to a holder with a first adhesive and then coated with a second adhesive on the first adhesive to reinforce the adhesive force with the holder and a camera module having the same.

An embodiment of the invention may provide a reflective module for an image stabilization and a camera module having the same.

Technical Solution

A reflective module according to an embodiment of the invention includes a holder having an inclined bottom surface and both side walls of the inclined bottom surface; a reflective member disposed on the holder; and an adhesive bonding the reflective member to the holder, wherein the reflective member includes an incident surface, an exit surface, and a reflective surface opposite to the bottom surface, and the holder has a first surface facing both side surfaces of the reflective member. and a second recess portion, wherein the adhesive includes: a first adhesive adhered to lower portions of each side of the reflective member within the first and second recess portions; and a second adhesive adhered to an upper portion of each side surface of the reflective member, and the first and second adhesives may be of different types.

According to an embodiment of the invention, the reflective member may include a prism, the first adhesive may include an adhesive cured by ultraviolet rays, and the second adhesive may include an adhesive cured by heat.

According to an embodiment of the invention, the first and second recess portions may include a first recess having a first depth from an upper surface of the holder to a bottom, and a second recess having a second depth from the bottom of the first recess, and a third recess having a third depth from the bottom of the first recess, wherein the third depth is larger than the first and second depths, and the third recess is disposed closer to the exit surface of the reflective member than the second recess.

According to an embodiment of the invention, the third recess may include a sub-recess extending from a bottom of the third recess to the bottom surface of the holder.

According to an embodiment of the invention, the first adhesive may be disposed in the second and third recesses and the sub-recess, and the second adhesive may be disposed in an upper surface of the first adhesive and in the first recess.

According to an embodiment of the invention, the second adhesive may extend inside the second and third recesses. An area of the third recess facing each side surface of the reflective member may be greater than an area of the first recess.

According to an embodiment of the present invention, a stop protrusion disposed on one side of the first recess and disposed lower than an upper surface and higher than the bottom of the first recess to limit the height of the second adhesive may include. A plurality of spacers spaced a reflective surface of the reflective member apart from the bottom surface at each corner of the bottom surface of the holder may be included. The holder may include stoppers at lower ends of both sides of the exit surface of the reflective member to prevent movement of the reflective member.

According to an embodiment of the invention, the first housing to which the holder is coupled to an inside; a holder guide portion coupled to a rear side of the holder and guiding rotation of the holder; a back cover coupled to a rear side of the holder guide portion; and a cover having an opening portion on a region facing to the incident surface of the reflective member at an upper portion of the first housing.

According to an embodiment of the present invention, a plurality of driving portions having coils and magnets opposed to each other on both side surfaces and lower portions of the first housing and the holder may include, and the holder guide portion includes a plurality of first and second protrusions coupled to a groove disposed at a rear side of the holder and a groove disposed at a front side of the back cover.

A camera module according to an embodiment of the invention may include the reflective module; and a lens module and an image sensor module aligned in the direction of the optical axis of the reflective module.

Advantageous Effects

In an embodiment of the invention, since the reflective member is adhered to the holder with different types of adhesives, it is possible to prevent problems in which the reflective member is separated or the adhesive leaks out.

In an embodiment of the invention, the reflective member and the holder may be stably bonded with an adhesive of different materials by applying a heat curable adhesive on the UV adhesive after bonding with an ultraviolet adhesive.

According to an embodiment of the invention, it is possible to improve component reliability and suppress a field defect rate by preventing a problem in which the adhesive property of the first adhesive is deteriorated due to the material characteristics of the holder to which the reflective member is assembled.

According to an embodiment of the invention, it is possible to improve the optical reliability of a reflective module having an image stabilization function and a camera module having the same. In addition, reliability of the camera module and a portable terminal having the same may be improved.

BEST MODE

Figure 1:
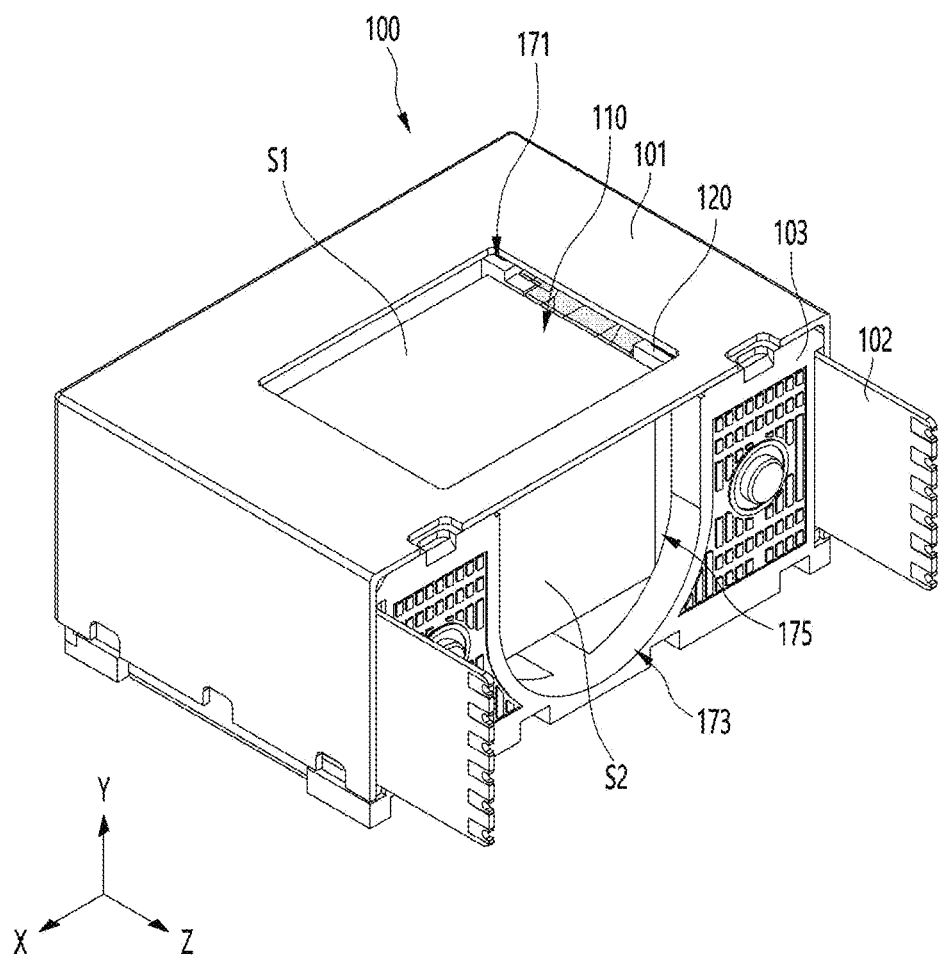
FIG. 1 is a perspective view of a reflective module according to an embodiment of the invention.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

A camera device including multiple lenses is mounted on a miniaturized mobile device such as a mobile terminal or vehicle, and it implements optical zoom function (zoom-in/zoom-out), auto-focusing (AF) function, and/or optical image stabilization (OIS) or hand-shake correction function by adjusting the distance between multiple lenses. In addition, several embodiments described below may be combined with each other unless specifically stated that they cannot be combined with each other. In addition, unless otherwise specified, descriptions for other embodiments may be applied to missing parts in the description of any one of several embodiments.

Figure 2:
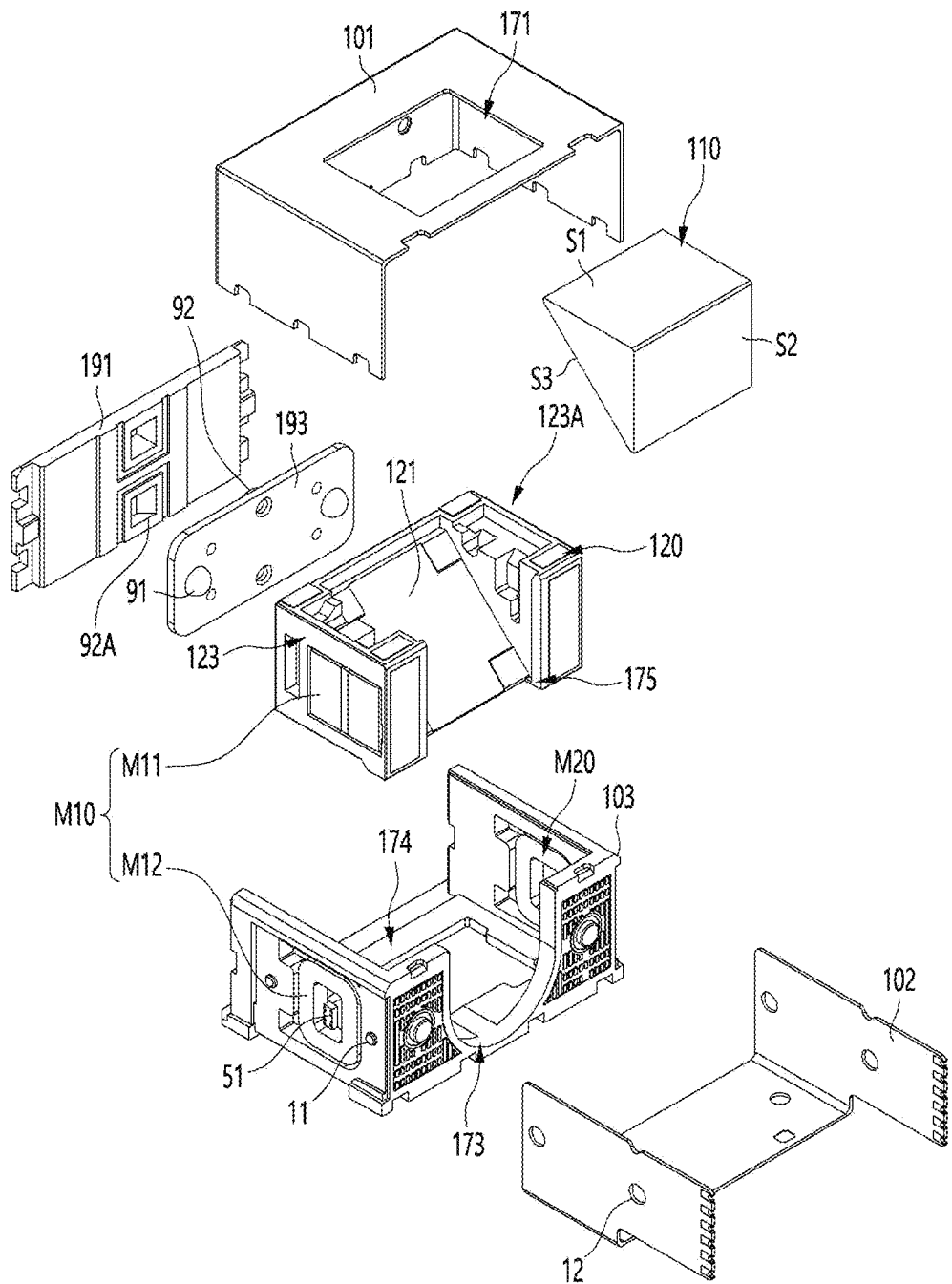
FIG. 2 is an exploded perspective view of the reflective module of FIG. 1.
Figure 3:
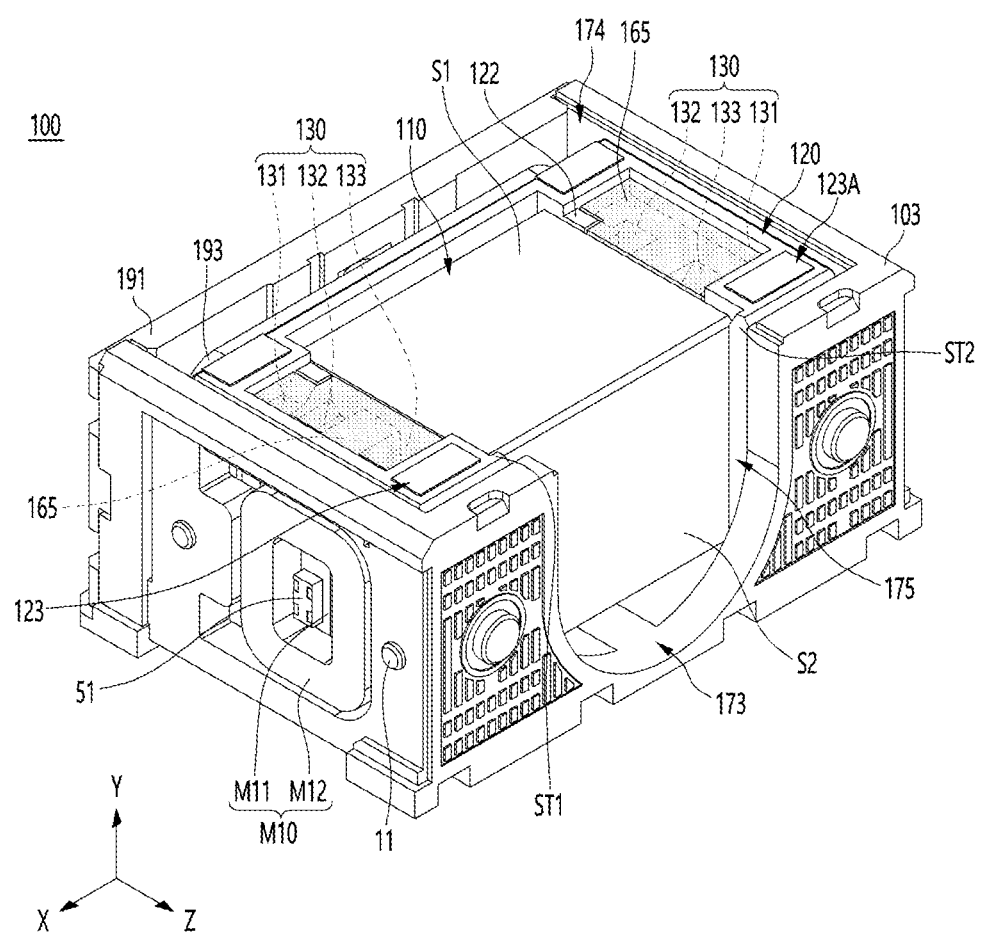
FIG. 3 is a perspective view showing a reflective member and its surroundings in the reflective module of FIG. 2.
Figure 4:
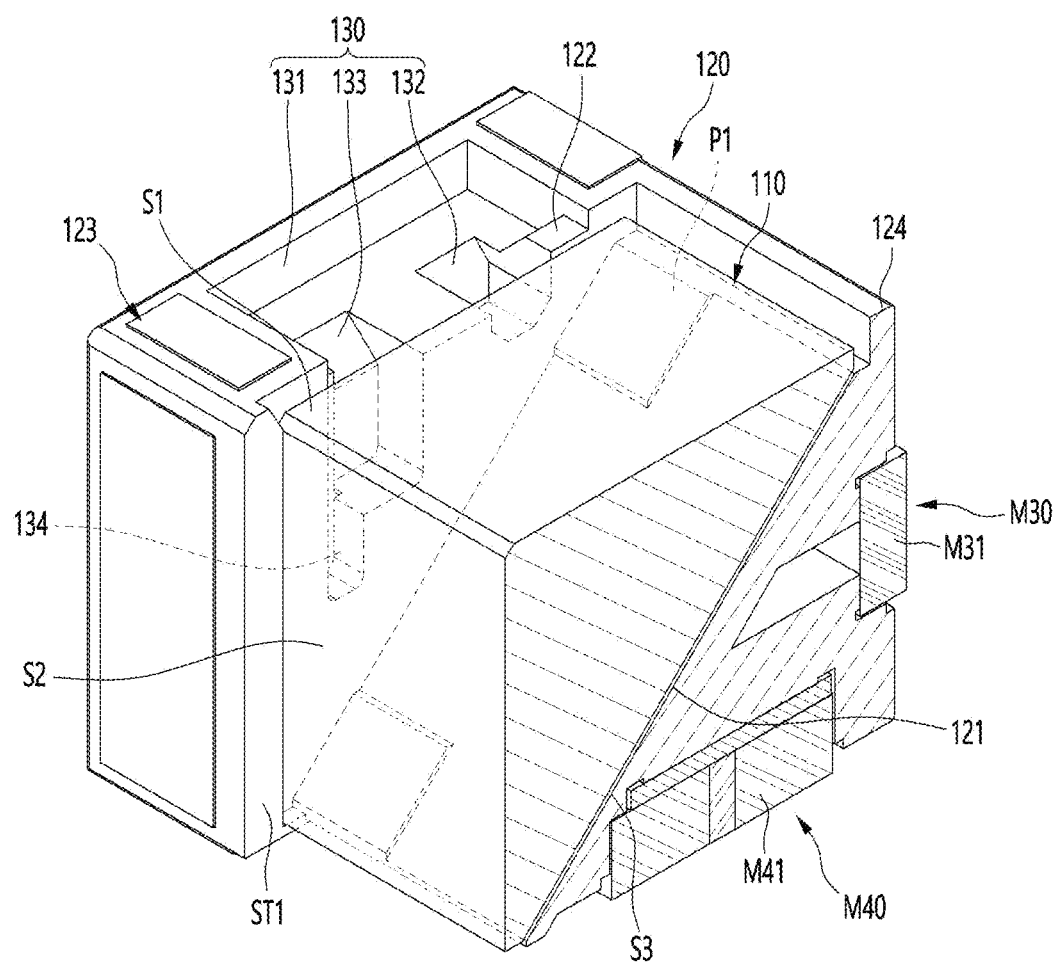
FIG. 4 is a partial perspective view illustrating a recess in which an adhesive of a reflective member and a holder is accommodated in the reflective module of FIG. 2.
Figure 5:
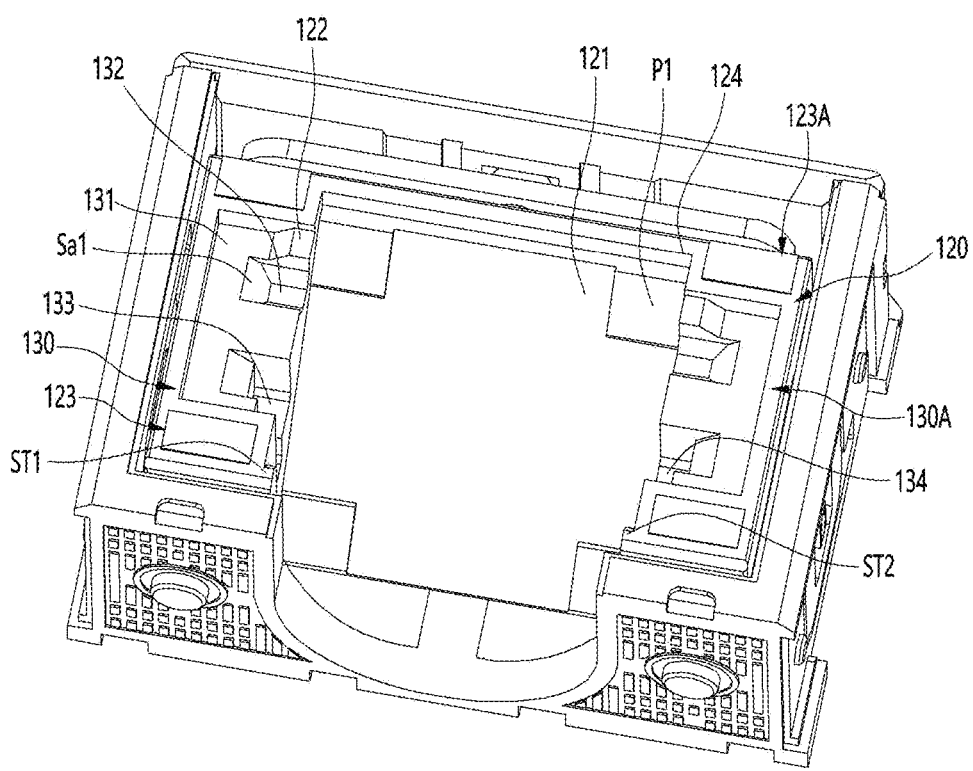
FIG. 5 is a perspective view showing a bottom and a recess of the holder in FIG. 3.
Figure 6:
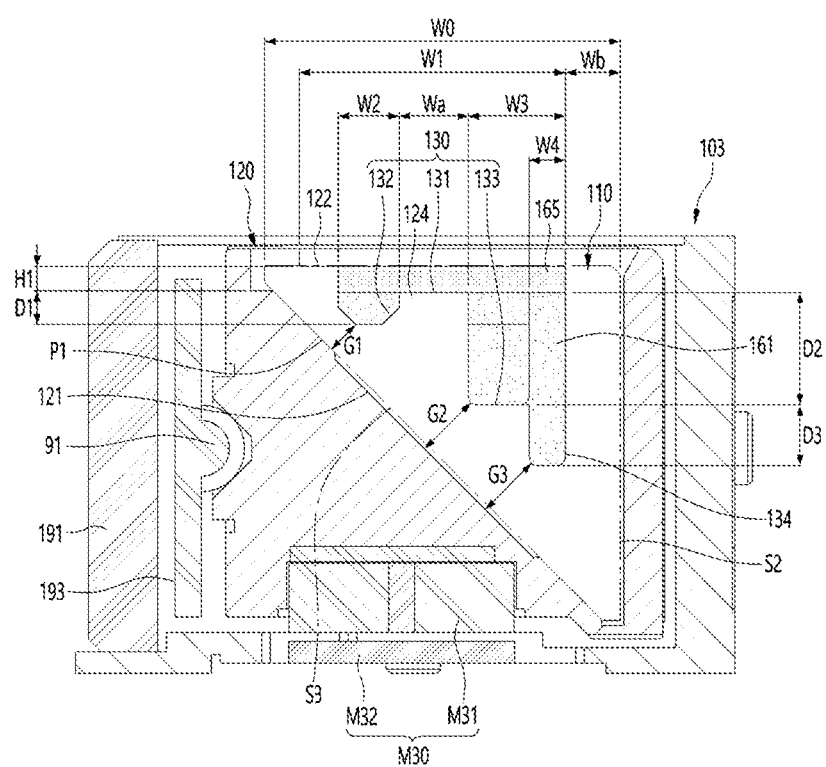
FIG. 6 is a side cross-sectional view showing an adhesive state between a reflective member and a holder in the reflective module of FIG. 3.
Figure 7:
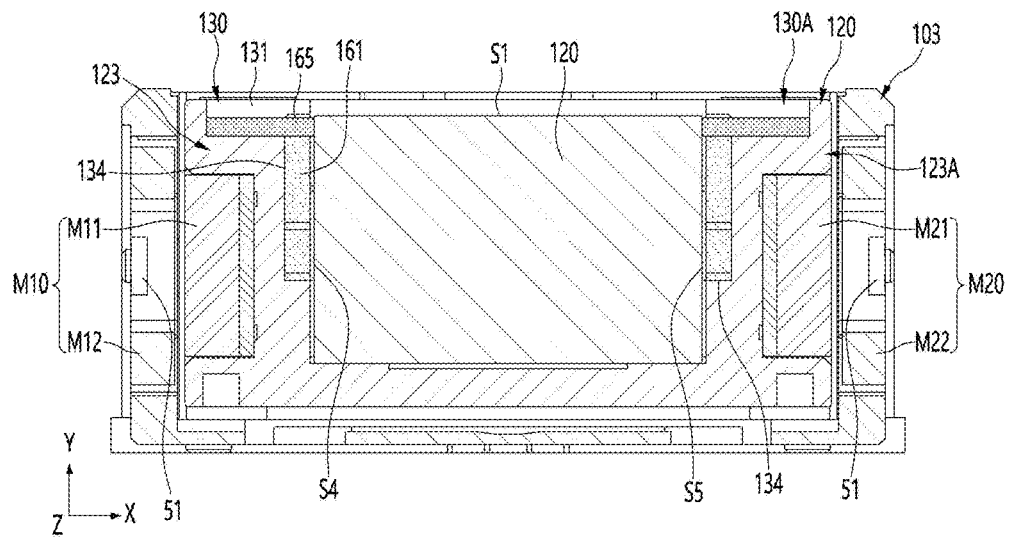
FIG. 7 is another cross-sectional view showing an adhesive state between a reflective member and a holder in the reflective module of FIG. 3.
Figure 8:
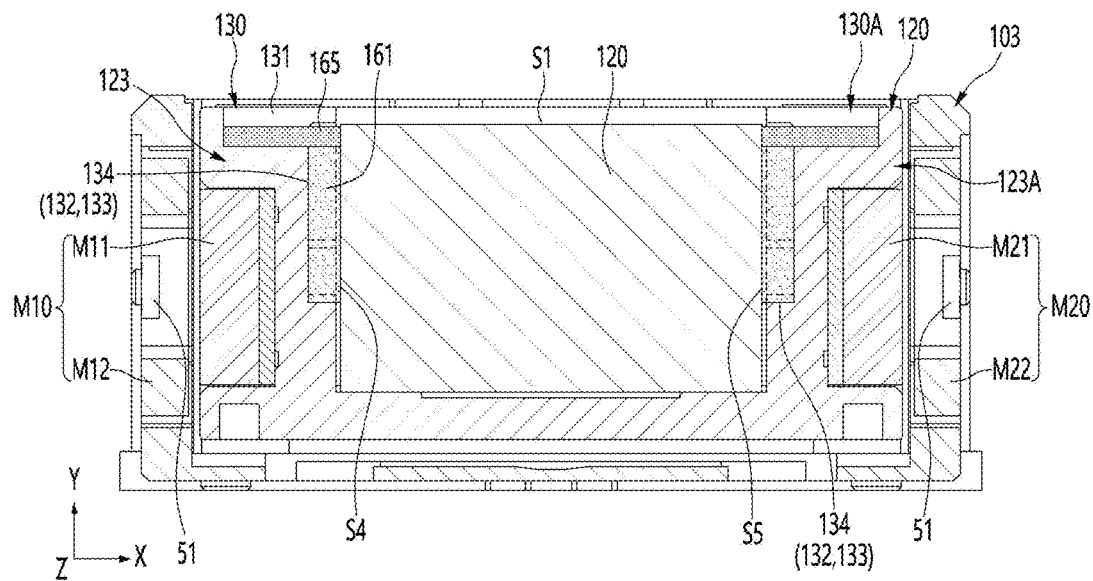
FIG. 8 is a side cross-sectional view showing another example of an adhesive bonded between a reflective member and a holder in the reflective module of FIG. 7.
Figure 9:
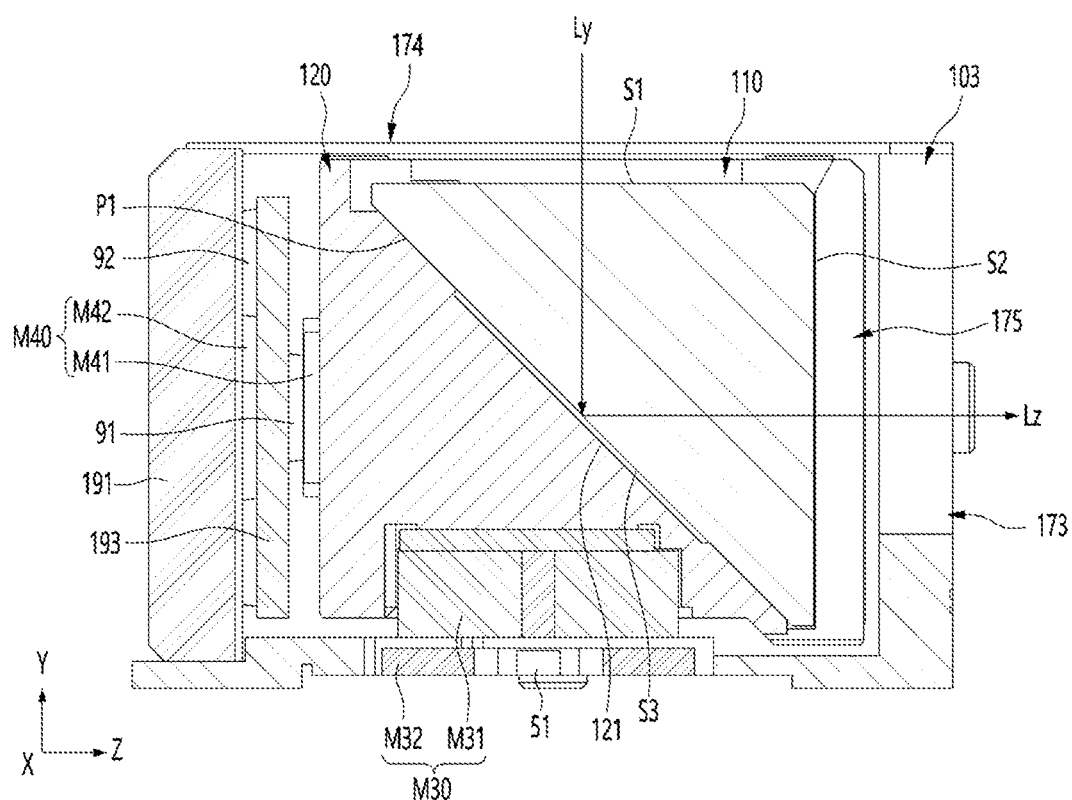
FIG. 9 is a cross-sectional view showing bottom, side, and rear portions of a holder supporting a reflective member in the reflective module of FIG. 3.

FIG. 1 is a perspective view of a reflective module according to an embodiment of the invention, FIG. 2 is an exploded perspective view of the reflective module of FIG. 1, FIG. 3 is a perspective view showing a reflective member and its surroundings in the reflective module of FIG. 2, FIG. 4 is a partial perspective view illustrating a recess in which an adhesive of a reflective member and a holder is accommodated in the reflective module of FIG. 2, FIG. 5 is a perspective view showing a bottom and a recess of the holder in FIG. 3, FIG. 6 is a side cross-sectional view showing an adhesive state between a reflective member and a holder in the reflective module of FIG. 3, FIG. 7 is another cross-sectional view showing an adhesive state between a reflective member and a holder in the reflective module of FIG. 3, FIG. 8 is a side cross-sectional view showing another example of an adhesive bonded between a reflective member and a holder in the reflective module of FIG. 7, FIG. 9 is a cross-sectional view showing bottom, side, and rear portions of a holder supporting a reflective member in the reflective module of FIG. 3.

Referring to FIGS. 1 to 9, the reflective module 100 according to an embodiment of the invention may be disposed in a camera module in a portable electronic device or a mobile body. The reflective module 100 reflects the incident light in the direction of the optical axis Lz (see FIG. 9) of the lenses of the camera module. Since the plurality of lenses of the camera module are disposed perpendicular to the thickness direction of the portable electronic device in the portable electronic device, the portable device equipped with the camera module may be miniaturized while having AF, zoom, and OIS functions. In addition, the camera module may include an inner lens holder in which a plurality of lenses is disposed between the reflective module 100 and the image sensor, and an outer lens holder having at least one lens between the reflective module 100 and the object. Hereinafter, for convenience of description, the reflective module 100 will be mainly described, and the reflective module 100 may include an image stabilization (OIS) function.

Referring to FIGS. 1 to 5, the reflective module 100 according to the embodiment of the invention includes a first housing 103, a holder 120 coupled to an inner portion of the first housing 103, a reflective member 110 coupled to an inner portion of the holder 120, a cover 101 having an opening portion and covering an upper portion and side portions of the first housing 103, a driving portions M10, M20, and M30 disposed on both side portions and/or lower portion of the first housing 103 and the holder 120, a substrate 102 disposed on the both side portions and the lower portion of the first housing 103 and electrically connected to the driving portions M10, M20, and M30, a holder guide portion 193 coupled to a rear side of the holder 120, and a back cover 191 coupled to a rear side of the holder guide portion 193.

In the first housing 103, the holder 120 may be coupled to the opening portion 171 and an inner portion 174 open to the front side in the direction of the optical axis Lz (see FIG. 9). Holes to which parts of the first and second driving portions M10 and M20 are coupled may be formed on both side surfaces of the first housing 103. Coupling protrusions 11 coupled to the coupling holes 12 of the substrate 102 may be formed on both side surfaces of the first housing 103. The holder 120 may have an opening region 175 with an open front side and an open upper side, and may include an inclined bottom surface 121. The inclined bottom surface 121 may be inclined in a range of 40 degrees to 50 degrees, for example, at an angle of 45 degrees. The holder 120 has side walls 123 and 123A disposed on both sides thereof, and the reflective member 110 may be inserted and coupled between the inclined bottom surface 121 and the side walls 123 and 123A.

The reflective member 110 may be coupled to the bottom surface 121 of the holder 120. The reflective member 110 may be a mirror or a prism, preferably, a prism. The reflective member 110 is made of glass and may have a triangular shape. The reflective member 110 has an incident surface S1 exposed to the outside or facing an object, an exit surface S2 exposed in the direction of the optical axis, and a reflective surface S3 on the bottom surface 121 of the holder 120, and the light incident on the incident surface S1 is reflected by the reflective surface S3 and proceed toward a lens module in the direction of the optical axis through the exit surface S2. An imaginary straight line extending from the exit surface S2 and the incident surface S1 may have an angle between a virtual straight line extending from the reflective surface S3 and a range of 40 degrees to 50 degrees, for example, at an angle of 45 degrees.

As shown in FIG. 5, the plurality of spacers P1 may be disposed on the bottom surface 121 of the holder 120, and the plurality of spacers P1 may space the reflective surface S3 of the reflective member 110 apart from the bottom surface 121. The spacer P1 may be disposed at each corner of the bottom surface 121 and may be bonded to the reflective surface S3 of the reflective member 110. As another example, the reflective surface S3 of the reflective member 110 may be adhered to the bottom surface 121 in a region that does not affect the reflection of light.

The holder 120 may include a stoppers ST1 and ST2, and the stoppers ST1 and ST2 may be disposed to the front side of the holder 120 or the both sides of a lower end of the exit surface S2 of the reflective member 110. Each of the stoppers ST1 and ST2 may overlap the reflective member 110 by 0.3 mm or less, for example, in a range of 0.15 mm to 0.3 mm. When the stoppers ST1 and ST2 are smaller than the above range, it is difficult to support the reflective member 110, and when they are larger than the above range, the area of the front opening portions 173 and 175 of the holder 120 is reduced. The outer wall 124 of the holder 120 may protrude higher than the upper surface of the reflective member 110 outside the upper surface of the reflective surface S3.

As shown in FIGS. 2, 6 and 9, the holder guide portion 193 has a polygonal plate shape and may be coupled between the back cover 191 and the holder 120. The first protrusion 91 of the holder guide portion 193 may be coupled to a groove of the holder 120 and the second protrusion 92 may be coupled to a groove 92A of the back cover 191.

The holder guide portion 193 is disposed at the rear side of the holder 120 and the first protrusions 91 of the holder guide portion 193 are coupled to the rear groove of the holder 120 to guide rotation in the second axis Y direction based on the first axis X direction of the holder 120. At the rear side of the holder guide portion 193, the second protrusions 92 are coupled to the back cover 191 in the form of grooves/protrusions, and the second protrusions 92 guide the rotation of the holder guide portion 193 and the holder 120 in the first axis X direction with respect to the second axis Y.

For example, the first protrusion 91 is spaced apart in the horizontal left/right direction (X axis) from the center of the front surface (inner surface) of the holder guide portion 193, and the second protrusion 92 may be spaced apart in a vertical up/down direction (Y axis) from the center of the rear surface (outside surface) of the holder guide portion 193. Accordingly, the first protrusion 91 and the second protrusion 92 may guide the holder 120 moving in up/down/left/right directions. A plurality of grooves 92A are disposed on an inner surface of the back cover 191, that is, a surface opposite to the holder guide portion 193, and the grooves 92A may be respectively disposed above and below the vertical direction (Y axis) with respect to the center line. The grooves and the first and second protrusions 91 and 92 may have a hemispherical shape.

The cover 101 may have an opening portion 171 therein facing the incident surface S1 of the reflective member 110 and side portions bent to both sides of the first housing 103. The cover 101 may be made of metal or plastic. The substrate 102 extends from the bottom of the first housing 103 toward both sides of the first housing 103, that is, may extend between both sides of the first housing 103 and side portions of the cover 101, respectively. The substrate 102 extends to both side surfaces and the lower surface of the first housing 103, and may be electrically connected to the coils and position sensors 51 of each driving portions M10, M20, and M30. The driving portions M10, M20 and M30 may each include a VCM actuator or a piezoelectric element.

As shown in FIG. 7, a first driving portion M10 and a second driving portion M20 are disposed on opposite sides of each other of the first housing 103 and the holder 120, and the first driving portion M10 may include a mover M11 disposed on the first side of the holder 120 and a stator M12 disposed on the first housing 103 opposite to the first side. The second driving portion M20 may include a mover M21 disposed on the second side of the holder 120 and a stator M22 disposed on the first housing 103 opposite to the second side. The movers M12 and M22 of the first and second driving portions M10 and M20 may include magnets, and the stators M11 and M21 may include coils. When power is applied to the coils of the first and second driving portions M10 and M20, a driving force is generated in the direction of the first axis X, and the holder 120 rotates based the direction of the second axis Y. Here, the stators M12 and M22 of the first and second driving portions M10 and M20 are electrically connected to each side of the substrate 102, and the position sensors 51 may be disposed inside the stators M12 and M22 and connected to the substrate 102.

As shown in FIGS. 6 and 9, a third driving portion M30 is disposed under the first housing 103 and the holder 120, and the third driving portion M30 may include a mover M31 under the holder 120 and a stator M32 at the bottom of the first housing 103. The mover M31 of the third driving portion M30 may include a magnet, and the stator M32 may include a coil. When power is applied to the coil of the third driving portion M30, a driving force is generated in the direction of the second axis Y, and the holder 120 is rotated in the direction of the second axis Y based on the first axis X direction. A position sensor 51 may be disposed inside the coil of the third driving portion M30. The position sensors 51 disposed in the first to third driving portions M10, M20, and M30 may be hall sensors for closed-loop control that detects and feeds back the position of the holder 120 when the holder 120 is rotated.

As shown in FIG. 9, the first mover M41 is disposed on a rear side of the holder 120 and the second mover M42 is disposed on a rear side of the holder guide portion 193, both of the second movers M41 and M42 may be magnets, or the first mover M41 may be a magnet and the second mover M42 may be a coil. The first and second movers M41 and M42 exert a repulsive force or attractive force on each other, and the holder 120 may support rotation about the first axis X and/or the second axis Y by the driving force of the first to third driving portions M10, M20, and M30 in contact with the first housing 103.

Meanwhile, as shown in FIGS. 3 to 5, describing at the combination of the holder 120 and the reflective member 110, the inner sides of both side walls 123 and 123A of the holder 120 may be formed in a shape corresponding to the shape of both side surfaces of the reflective member 110, for example, in a triangular shape.

As shown in FIGS. 6 and 7, the first and second recess portions 130 and 130A are disposed inside each side wall 123 and 123A of the holder 120, and the first and second recess portions 130 and 130A may face each side surface S4 and S5 (see FIG. 7) of the reflective member 110. Each of the first and second recess portions 130 and 130A includes a first recess 131, and second and third recesses 132 and 133 extending toward the bottom surface 121 in different regions from the first recess 131. The third recess 133 may include a sub-recess 134 extending downward in a direction of the optical axis or all directions.

As shown in FIG. 6, the first recess 131 has an open upper portion, has a predetermined depth H1 from the upper surface to the bottom, and may have a flat bottom. The length W1 of the first recess 131 in the direction of the optical axis Z may be smaller than the length W0 of the reflective member 110, for example, 60% or more of the length W0, in the range of 60% to 90% or in the range of 62% to 82%. The first depth H1 of the first recess 131 may be less than 1 mm, for example, in a range of 0.3 mm to 0.7 mm or in a range of 0.4 mm to 0.6 mm. The bottom of the first recess 131 may be disposed lower than the upper surface of the reflective member 110, and the upper surface may be disposed higher than the upper surface of the reflective member 110. The second and third recesses 132 and 133 are connected to the bottom of the first recess 131, and the second depth D1 of the second recess 132 may be smaller than the third depth D2 of the third recess 133, that is, the third depth D2 may be greater than the first depth H1 and the second depth D1.

A length W2 of the second recess 132 in the direction of the optical axis Z may be smaller than a maximum length W3 of the third recess 133. The length W2 of the second recess 132 may be equal to the minimum length (difference between lengths W3 and W4) of the third recess 133. The length W2 of the second recess 132 may be greater than or equal to 0.4 mm, for example, in the range of 0.4 mm to 1 mm or in the range of 0.5 mm to 0.9 mm. The length Wa of the barrier 124 between the second recess 132 and the third recess 133 is equal to or 80% of the length W2 of the second recess 132 to prevent interference between adjacent recesses 132 and 133 and may be formed with a thickness that does not deform during injection molding. The sub-recess 134 may be spaced apart from the exit surface S2 of the reflective member 110 by a predetermined distance Wb. The length Wa and the distance Wb may be provided in a range of 0.5 mm or more, for example, in a range of 0.5 mm to 1 mm.

The third depth D2, which is the minimum depth of the third recess 133 may be at least twice the maximum depth D1 of the second recess 132, for example, in the range of 2.5 to 7 times or in the range of 3 to 6 times. The depth (D2+D3) of the sub-recess 134 in the third recess 133 may be the deepest, and a predetermined depth D3 from the bottom of the third recess 133 may be deeply in a range of, for example, 0.3 mm or more, for example, in the range of 0.3 mm to 0.9 mm. Here, the maximum depth (D2+D3) of the third recess 133 may be 1.5 mm or more, for example, in the range of 1.5 mm to 2.8 mm or in the range of 1.8 mm to 2.6 mm. This means that the maximum depth D2+D3 of the third recess 133 may be greater than 50% of the height of the exit surface S2 of the reflective member 110, and may be, for example, in the range of 60% to 90% or 60% to 80%. Accordingly, an adhesive area facing both side surfaces S4 and S5 of the reflective member 110 may be increased.

Describing at the area facing the side surface of the reflective member 110, an area of the second recess 132 may be smaller than an area of the first recess 131 and smaller than an area of the third recess 133. The area of the third recess 133 may be twice or more or three times the area of the second recess 132. The third recess 133 may be disposed closer to the exit surface S2 than the second recess 132. The sub-recess 134 may be disposed closest to the exit surface S2 among the third recesses 133. The height of the exit surface S2 may be 95% or more of the maximum length of the reflective member 110.

The minimum distance G1 between the lower end of the second recess 132 and the bottom surface 121 may be smaller than the minimum distance G2 between the third recess 133 and the bottom surface 121 or the spacer P1. The distance G2 between the bottom surface 121 of the third recess 133 may be equal to or smaller than the distance G3 between the sub-recess 134 and the bottom surface 121. The smallest distance G1 among the distances G1, G2, and G3 is formed in a range of 0.3 mm or more, for example, a range of 0.3 mm to 0.7 mm or a range of 0.3 mm to 0.6 mm, so that the inflow of the adhesive 161 into the bottom surface 123 may be suppressed.

The second and third recesses 132 and 133 may include inclined surfaces Sal (see FIG. 5) so that the adhesives 161 and 165 may be easily inserted therein. In addition, since the second and third recesses 132 and 133 have inclined surfaces Sal, injection of the adhesives 161 and 165 is easy and the content of the adhesives 161 and 165 may be increased. Accordingly, the adhesive strength of the adhesives 161 and 165 with each side surface S4 and S5 of the reflective member 110 may be improved.

As shown in FIGS. 6 and 7, the second and third recesses 132 and 133 are filled with the first adhesive 161, and the first recess 131 is filled with the second adhesive 165. The first adhesive 161 may be filled in the sub-recess 134. The first adhesive 161 may be adhered to each side surface S4 and S5 of the reflective member 110. The second adhesive 165 may be disposed on the first adhesive 161. The first adhesive 161 may be filled in the sub-recess 134. The first and second adhesives 161 and 165 may be adhered to each side surface S4 and S5 of the reflective member 110.

A stop protrusion 122 for limiting the height of the second adhesive 165 may be disposed on one side of the first recess 131 or one side of the second recess 132. The height H2 of the stop protrusion 122 may be lower than the upper surface of the first recess 131 and higher than the bottom. The height H2 of the upper surface of the stop protrusion 122 may be equal to or higher than the height of the incident surface S1 of the reflective member 110 by a difference of 0.1 mm or less. The height of the second adhesive 165 may be adjusted by the stop protrusion 122. The amount of the second adhesive 165 may be 50% or less, for example, 20% to 50% of the depth H1 of the first recess 131.

The second adhesive 165 may be attached to the first recess 131. The second adhesive 165 may be disposed on the first adhesive 161. The second adhesive 165 may be disposed on an upper portion of the second and third recesses 132 and 133. The second adhesive 165 may adhere to the entire upper surface of the first adhesive 161. The second adhesive 165 may be adhered to the side surfaces S4 and S5 of the reflective member 110, the upper surface of the first adhesive 161, and the bottom and side surfaces of the first recess 131. The first adhesive 161 can be bonded to at least three types of materials, so that different materials can be firmly adhered to each other.

The first and second adhesives 161 and 165 may be of different types. The first adhesive 161 may be made of a material having higher viscosity than that of the second adhesive 165. The first adhesive 161 may be made of a material that is less changed during a curing process than the second adhesive 165. The first adhesive 161 may be an adhesive cured by ultraviolet rays, and the second adhesive 165 may be an adhesive cured by heat. The surface colors of the first adhesive 161 and the second adhesive 165 may be the same or different, and may be made of a material that does not reflect light. Any one or both of the first and second adhesives 161 and 165 may be made of a black or gray material.

The first adhesive 161 is a UV adhesive and may include, for example, an acrylate ($C_3H_3O_2$)-based material. As another example, it may include at least one of polyether polyol and hydroxy-based materials. The second adhesive 165 is a thermosetting adhesive and may include, for example, an epoxy resin ($C_2H_3O_3$)-based material.

Table 1 is a table comparing the curing method of UV adhesive and thermal curing adhesive, post-thermal cure, shadow cure, cure shrinkage, and adhesive strength characteristics with glass or plastic.

TABLE 1

| Curing type | UV adhesive | Thermal curing adhesive |
| --- | --- | --- |
| Curing method | Radical | Radical |
| Post-thermal cure | Preferred | Need |
| Shadow cure | No | Yes |
| Cure shrinkage | High | Low |
| Adhesion (w/Glass & plastics) | Bad | Good |

Figure 12:
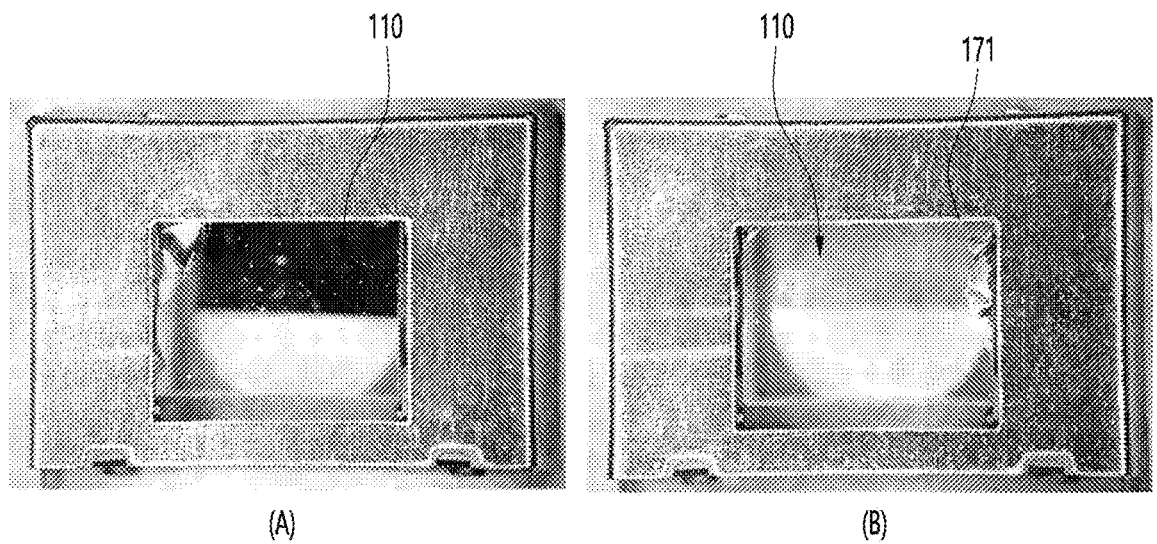
FIGS. 12 (A) and (B) are views showing a modified example of an adhesive on a reflective module according to a comparative example.

As shown in Table 1 above, it may be seen that the adhesion of the UV adhesive to glass and plastic is lower than that of the heat curing adhesive. After assembling the reflective member 110 to the holder 120, the UV adhesive has a viscosity that does not penetrate between the holder 120 and the reflective member 110, and there is no change in curing performance, so primarily, the holder 120 and the reflective member 110 may be adhered to each other. The holder 120 may be made of a plastic or polymer material, for example, a liquid crystal crystalline polymer (LCP) material. Since the adhesive strength of the material of the holder 120 with a material such as UV adhesive is reduced, in the absence of the second adhesive, peeling between the UV adhesive and the holder 120 may occur during assembly of the reflective member 110, at this time, a problem may occur in which the reflective member 110, that is, the prism may be separated from the holder 120. As in the comparative example of FIG. 12(A)(B), when the prism is adhered to the holder 120 by applying only the UV adhesive, the adhesive portion between the UV adhesive and the holder 120 peels off after the impact reliability test. In addition, the UV adhesive may penetrate into the effective region of the prism, that is, the inside of the opening portion 171, or the prism may be damaged. Accordingly, a problem may occur in terms of reliability of the reflective module 100.

In an embodiment of the invention, since the second adhesive 165 is applied on the first adhesive 161, the adhesive force between the first adhesive 161, the reflective member 110, and the holder 120 may be strengthened. Accordingly, the second adhesive 165 may suppress the flow of the first adhesive 161 and the reflective member 110 while strengthening the adhesive force between the reflective member 110 and the holder 120. Therefore, the defect rate of the reflective module 100 may be reduced and reliability may be improved. The first and second adhesives are different types of adhesives, and for example, the first adhesive 161 may be a UV adhesive and the second adhesive 165 may be a heat curable adhesive.

As shown in FIG. 8, the first adhesive 161 may be filled up to 70% or less of the depths D1 and D2)(see FIG. 6) of the second and third recesses 132 and 133, and at this time, the second adhesive 165 may be filled up to at least 30% of the depths D1 and D2 to the upper portions of the second and third recesses 132 and 133. Accordingly, since the first and second adhesives 161 and 65 are attached in the second and third recesses 132 and 133, the adhesive force between the reflective member 110 made of glass and the holder 120 made of plastic is improved, and the first adhesive 161 may be stabilized from external impact.

Figure 10:
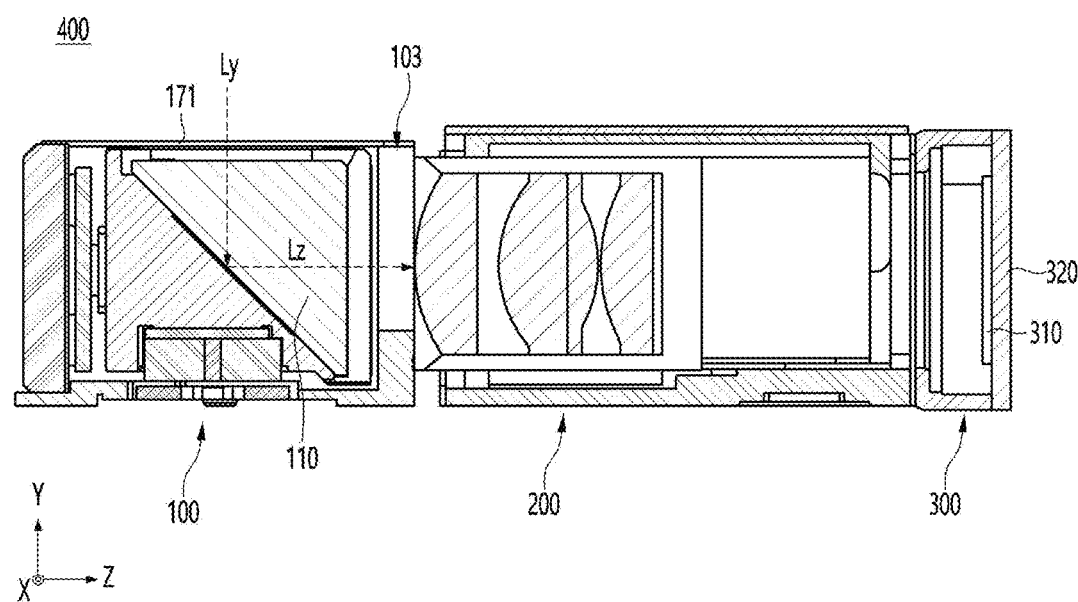
FIG. 10 is an example of a cross-sectional side view of a camera module having a reflective module of FIGS. 1 to 3.

As shown in FIG. 10, a camera module 400 according to an embodiment of the invention may include the reflective module 100, a lens module 200 and an image sensor module 300. The lens module 200 and the image sensor module 300 may be aligned along the optical axis of the reflective module 100. A plurality of lenses may be aligned in a lens holder in the lens module 200, and an image sensor 310 may be attached to the image sensor module 300 on the main substrate 320. The plurality of lenses may be disposed in one lens holder or may be separated in at least two lens holders. In addition, the lens module 200 may include an actuator having an AF function or/and an OIS function around the lens holder, but is not limited thereto. By arranging the optical axes of the lenses of the lens module 200 in a direction orthogonal to the thickness of the portable electronic device, a high-resolution camera module may be provided without increasing the thickness of the portable electronic device.

Figure 11:
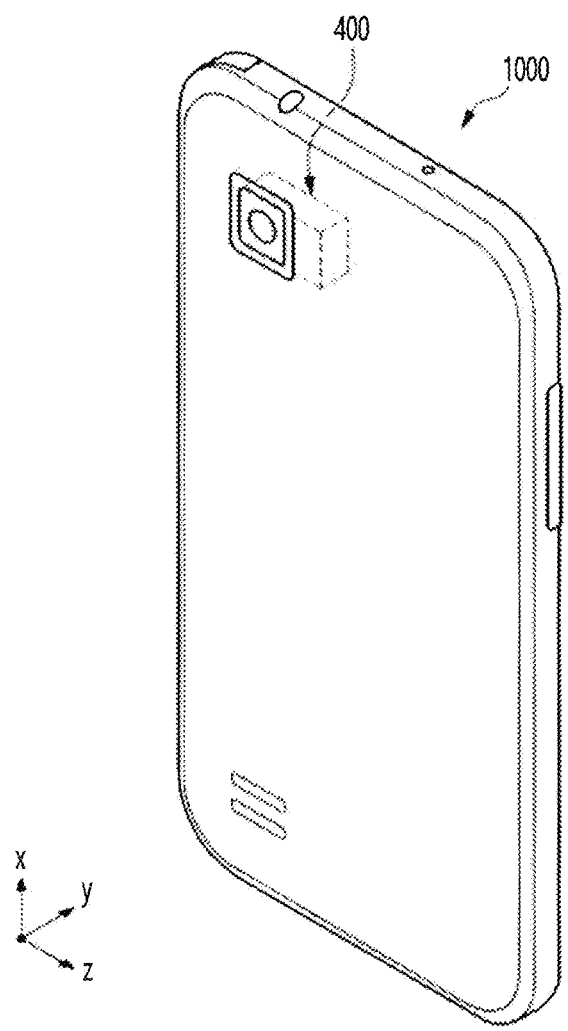
FIG. 11 is an example of a portable electronic device having the camera module of FIG. 9.

Referring to FIG. 11, a portable electronic device 1000 according to an embodiment of the invention may be a portable electronic device such as a mobile communication terminal equipped with a camera module 400, a smart phone, or a tablet PC. As another example, a portable electronic device may be a moving mobile device such as a vehicle.

The portable electronic device 1000 is equipped with a camera module 400 to photograph a subject.

The camera module 400 includes a plurality of lenses. In an embodiment of the invention, the camera module 400 is arranged so that the optical axis (Z-axis) of a plurality of lenses is perpendicular to the thickness direction (Y-axis direction, from the front surface of the portable electronic device 1000 to the rear surface or the opposite direction) of the portable electronic device 1000. For example, the optical axis (Z-axis) of the plurality of lenses provided in the camera module 400 may be formed in a width direction or a length direction of the portable electronic device 1000. Therefore, even if the camera module 400 has functions such as auto focusing (AF), zoom, and optical image stabilizing (OIS), the thickness of the portable electronic device 1000 may not be increased. Accordingly, miniaturization of the portable electronic device 1000 is possible.

The camera module 400 according to an embodiment of the invention may include at least one of AF, Zoom, and OIS functions. In the case of the camera module 400 having AF, Zoom, and OIS functions, the size of the camera module is increased compared to a general camera module. When the size of the camera module 400 increases, the portable electronic device 1000 on which the camera module 400 is mounted is also affected, and thus there is a limit to miniaturizing the portable electronic device 1000. For example, the camera module should form a long lens group for the zoom function, and when the optical axis (Z-axis) of the lens group is formed in the thickness direction of the portable electronic device, the thickness of the portable electronic device also increases according to the length of the lens group. When the thickness of the portable electronic device is not increased, the length of the lens group cannot be formed sufficiently long, and zoom performance is weakened. In addition, in order to implement the AF and OIS functions, an actuator for moving the lens group in the direction of the optical axis or in a direction perpendicular to the optical axis must be installed. The optical axis (Z axis) of the lens group is formed in the thickness direction of the portable electronic device. In this case, the actuator for moving the lens group must also be installed in the thickness direction of the portable electronic device. Accordingly, the thickness of the portable electronic device increases. However, since the camera module 400 according to the embodiment of the invention is arranged such that optical axis (Z-axis) of the plurality of lenses is perpendicular to the thickness direction of the portable electronic device 1000, so that the portable electronic device 1000 may be miniaturized while having AF, Zoom and OIS functions.

Features, structures, effects, etc. described in the embodiments above are included in at least one embodiment of the present invention, and are not necessarily limited to only one embodiment. Furthermore, the features, structures, and effects illustrated in each embodiment can be combined or modified with respect to other embodiments by those skilled in the art in the field to which the embodiments belong. Therefore, contents related to these combinations and variations should be construed as being included in the scope of the present invention. Although described based on the embodiments, this is only an example, this invention is not limited, and it will be apparent to those skilled in the art that various modifications and applications not illustrated above are possible without departing from the essential characteristics of this embodiment. For example, each component specifically shown in the embodiment can be modified and implemented. And the differences related to these modifications and applications should be construed as being included in the scope of the present invention as defined in the appended claims.

The invention claimed is:

1. A reflective module comprising:
    a holder having an inclined bottom surface and both side walls of the inclined bottom surface;
    a reflective member disposed on the holder; and
    an adhesive that adheres the reflective member to the holder,
    wherein the reflective member includes an incident surface, an exit surface, and a reflective surface facing the bottom surface,
    wherein the holder includes first and second recess portions facing both side surfaces of the reflective member,
    wherein the adhesive includes a first adhesive adhered to lower portion of each side surface of the reflective member in the first and second recess portions, and a second adhesive adhered to the upper portion of each side of the reflective member, and
    wherein the first and second adhesives are different types.
2. The reflective module of claim 1, wherein the reflective member comprises a prism, wherein the first adhesive comprises an adhesive cured by ultraviolet rays,
wherein the second adhesive comprises an adhesive cured by heat.

3. The reflective module of claim 2, wherein each of the first and second recess portions comprises a first recess having a first depth from an upper surface of the holder to a bottom of the first recess, and a second recess having a second depth from the bottom of the first recess, and a third recess having a third depth from the bottom of the first recess,
wherein the third depth is greater than the first and second depths, and
wherein the third recess is disposed closer to the exit surface of the reflective member than the second recess.

4. The reflective module of claim 3, wherein the third recess includes a sub-recess extending from a bottom of the third recess to a bottom surface of the holder.

5. The reflective module of claim 4, wherein the first adhesive is disposed in the second and third recesses and the sub-recess, and
wherein the second adhesive is disposed on an upper surface of the first adhesive and in the first recess.

6. The reflective module of claim 5, wherein the second adhesive extends inside the second and third recesses.

7. The reflective module according to claim 5, wherein an area of the third recess facing each side of the reflective member is larger than an area of the first recess.

8. The reflective module of claim 3, comprising:
a stop protrusion disposed at one side of the first recess and disposed lower than an upper surface of the first recess and higher than the bottom of the first recess to limit a height of the second adhesive; and
a plurality of spacers spaced the reflective surface of the reflective member apart from the bottom surface at each corner of the bottom surface of the holder,
wherein the holder includes stoppers at lower ends of both sides of the exit surface of the reflective member to prevent movement of the reflective member.

9. The reflective module of claim 1, comprising:
a first hosing to which the holder is coupled to an inside;
a holder guide coupled to a rear side of the holder and guiding rotation of the holder;
a back cover coupled to a rear side of the holder guide portion;
a cover having an opening portion on a region facing to the incident surface of the reflective member at an upper portion of the first housing; and
a plurality of driving portions having coils and magnets opposed to each other on both side surfaces and lower portions of the first housing and the holder,
wherein the holder guide portion includes a plurality of first and second protrusions coupled to a groove disposed at a rear side of the holder and a groove disposed at a front side of the back cover.

10. A camera module comprising:
a lens module having a plurality of lenses aligned on an optical axis;
a reflective module disposed on one side of the lens module; and
an image sensor module disposed on the other side of the lens module,
wherein the reflective module is the reflective module according to claim 9.

11. A camera module comprising:
a reflective module that reflects incident light; and
a lens module disposed on one side of the reflective module and having a plurality of lenses aligned on an optical axis;
wherein the reflective module comprises:
a holder having an inclined bottom surface and both side walls of the inclined bottom surface;
a reflective member disposed on the holder; and
an adhesive that adheres the reflective member to the holder,
wherein the reflective member includes an incident surface, an exit surface, and a reflective surface facing the bottom surface,
wherein the holder includes first and second recess portions facing both side surfaces of the reflective member,
wherein the adhesive includes a first adhesive adhered to lower portion of each side surface of the reflective member in the first and second recess portions, and a second adhesive adhered to the upper portion of each side of the reflective member, and
wherein the first and second adhesives are different types.

12. The reflective module of claim 11, wherein the reflective member comprises a prism,
wherein the first adhesive includes an adhesive cured by ultraviolet rays, and
wherein the second adhesive includes an adhesive cured by heat.

13. The reflective module of claim 12, wherein each of the first and second recess portions comprises a first recess having a first depth from an upper surface of the first holder to a bottom of the first recess, and a second recess having a second depth from the bottom of the first recess, and a third recess having a third depth from the bottom of the first recess, and
wherein the third depth is greater than the first and second depths.

14. The reflective module of claim 13, wherein the third recess is disposed closer to an exit surface of the reflective member than the second recess.

15. The reflective module of claim 13, wherein the bottom of the first recess is disposed lower than the upper surface of the reflective member, and
wherein an upper surface of the first recess is disposed higher than an upper surface of the reflective member.

16. The reflective module of claim 13, wherein the first adhesive is disposed in the second and third recesses,
wherein the second adhesive is disposed on an upper surface of the first adhesive and in the first recess, and
wherein the second and third recesses are connected to each other on the bottom of the first recess.

17. The camera module of claim 16, comprising a barrier disposed between the second recess and the third recess.

18. The camera module of claim 13,
wherein a reflective surface of the reflective member is adhered to the inclined bottom surface of the holder.

19. The camera module of claim 13, comprising:
a stop protrusion disposed at one side of the first recess and disposed lower than an upper surface and higher than the bottom of the first recess to limit a height of the second adhesive; and
a plurality of spacers spaced apart from a bottom surface of the reflective member at each corner of the bottom surface of the holder, wherein the holder includes stoppers at both lower ends of the emitting surface of the reflective member to prevent movement of the reflective member, the camera module.

20. The camera module of claim 11, wherein the reflective module comprises:

a holder guide coupled to the other side of the holder and guiding rotation of the holder;

a back cover coupled to an outside of the holder guide portion;

a cover having an opening portion at an upper portion of the reflective member; and a plurality of driving portions having coils and magnets an outside of the holder.

* * * * *